United States Patent [19]

Jonas et al.

[11] Patent Number: 4,910,645
[45] Date of Patent: Mar. 20, 1990

[54] SOLID ELECTROLYTES, AND ELECTROLYTE CAPACITORS CONTAINING SAME

[75] Inventors: Friedrich Jonas, Aachen; Gerhard Heywang, Bergisch-Gladbach; Werner Schmidtberg, Leverkusen, all of Fed. Rep. of Germany

[73] Assignee: Bayer Aktiengesellschaft, Leverkusen, Fed. Rep. of Germany

[21] Appl. No.: 335,619

[22] Filed: Apr. 10, 1989

[30] Foreign Application Priority Data

Apr. 30, 1988 [DE] Fed. Rep. of Germany ....... 3814730

[51] Int. Cl.$^4$ ........................... H01G 9/00; B01J 17/00
[52] U.S. Cl. ..................................... 361/525; 29/25.03
[58] Field of Search ....................... 361/523, 525, 527; 252/500, 510, 518; 29/570.1

[56] References Cited

U.S. PATENT DOCUMENTS 4,508,639  4/1985  Camps et al. .................... 252/510 X
4,780,796  10/1988  Fukuda et al. ................. 29/570.1 X
4,803,596  2/1989  Hellwig et al. ..................... 361/525

Primary Examiner—Donald A. Griffin
Attorney, Agent, or Firm—Sprung, Horn, Kramer & Woods

[57] ABSTRACT

The invention relates to the use fo polythiophenes which are built up from structural units of the formula

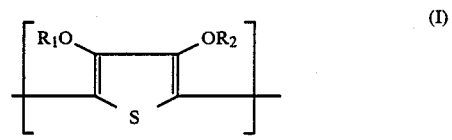

in which $R_1$ and $R_2$, independently of one another, stand for hydrogen or a $C_1$-$C_4$-alkyl group, or, together, form an optionally substituted $C_1$-$C_4$-alkylene radical or a 1,2-cyclohexylene radical, solid electrolytes in electrolyte capacitors, and to the electrolyte capacitors containing these solid electrolytes.

11 Claims, No Drawings

SOLID ELECTROLYTES, AND ELECTROLYTE CAPACITORS CONTAINING SAME

The invention relates to the use of certain polythiophenes as solid electrolyte in electrolyte capacitors, and to electrolyte capacitors which contain these polythiophenes as solid electrolytes.

Electrolyte capacitors which contain electroconductive organic compounds as solid electrolytes are known (see, for example, DE-OS (German Published Specification) 3,214,355 (≡U.S.-PS No. 4 580 855) and the prior art described therein). It is disadvantageous that the TCNQ complexes described in DE-OS (German Published Specification) 3,214,355 as solid electrolytes can only be processed (melted) at temperatures at which they have already reached their stability limit and that they eliminate prussic acid in the course of time and therefore have a toxic and corrosive action.

Japanese Published Application No. 86/239,617 describes doped polyalkyl- and polyalkoxy-anilines obtained by oxidative polymerization of alkyl- or alkoxy-anilines, for example 2,5-dimethoxyaniline, and Japanese Published Application No. 86/240,625 describes polypyrroles obtained by oxidative polymerization of pyrrole in the presence of adipic acid, in both cases as solid electrolytes. The processes described in the two Japanese applications for the production of solid electrolytes have the disadvantage that they are not reproducible.

It has now been found that polythiophenes obtainable by oxidative polymerization of specific thiophenes are particularly suitable as solid electrolytes for electrolyte capacitors. These specific polythiophenes can be applied adherently in a particularly simple manner, without imparting their conductivity, to the metal foils used as anodes in electrolyte capacitors, and give capacitors which are distinguished by good electrical properties, for example a high, substantially frequency-independent capacity, and furthermore by low dielectric losses and low leakage currents.

The invention therefore relates to the use of polythiophenes which are built up from structural units of the formula

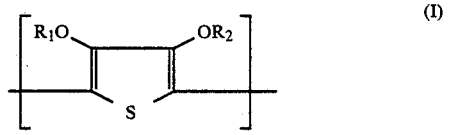

in which $R_1$ and $R_2$, independently of one another, stand for hydrogen or a $C_1$–$C_4$-alkyl group, or, together, form an optionally substituted $C_1$–$C_4$-alkylene radical, preferably a methylene radical which is optionally substituted by alkyl groups, a 1,2-ethylene radical which is optionally substituted by $C_1$–$C_{12}$-alkyl or phenyl groups, or a 1,2-cyclohexylene radical, as solid electrolytes in electrolyte capacitors.

$C_1$–$C_4$-Alkyl groups which may be mentioned, in particular, for $R_1$ and $R_2$ are the methyl and ethyl group.

Representatives which may be mentioned for optionally substituted $C_1$–$C_4$-alkylene radicals which, together, may form $R_1$ and $R_2$ are preferably 1,2-alkylene radicals which are derived from 1,2-dibromo-alkanes, as are obtainable on bromination of α-olefins, such as ethene, 1-propene, 1-hexene, 1-octene, 1-decene, 1-dodecene and styrene; in addition, the 1,2-cyclohexylene, 2,3-butylene, 2,3-dimethylene-2,3-butylene and 2,3-pentylene radical may be mentioned. Preferred radicals are the methylene, 1,2-ethylene and 1,2-propylene radical.

The polythiophenes to be used according to the invention are produced directly on the metal foils used as anodes and coated on one side with an oxide coating (for example anodized), preferably foils made from aluminium, niobium or tantalum, by oxidative polymerization of 3,4-dialkoxy-thiophenes of the formula

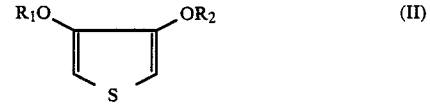

in which $R_1$ and $R_2$ have the meaning given under formula (I), by applying the dialkoxythiophenes of the formula (II) and the oxidants, preferably in the form of solutions, either separately one after the other or, preferably, together onto the side of the metal foil that is coated with the oxide coating, and completing the oxidative polymerization, if appropriate, depending on the activity of the oxidant used, by warming the coating.

The 3,4-dialkoxy-thiophenes of the formula (II) necessary for the preparation of the polythiophenes to be used according to the invention are either known or are obtainable by processes known in principle by reacting the alkali metal salts of 3,4-dihydroxy-thiophene-2,5-dicarboxylates with the appropriate alkyl halides or alkylene dihalides and subsequently decarboxylating the free 3,4-dialkoxy- or (alkylene-1,2-dioxy)-thiophene-2,5-dicarboxylic acids (see, for example, Tetrahedron 1967 Vol. 23, 2437–2441 and J. Am. Chem. Soc. 67 (1945) 2217–2218).

The oxidative polymerization of the 3,4-dialkoxythiophenes of the formula (II) is generally carried out at temperatures of from 20° to +250° C., preferably at temperatures of from 20° and 200° C., depending on the oxidant used and the reaction time desired.

Solvents which may be mentioned for the dialkoxythiophenes of the formula (II) and/or oxidants are, in particular, the following organic solvents which are inert under the reaction conditions: aliphatic alcohols such as methanol, ethanol and i-propanol; aliphatic ketons such as acetone and methyl ethyl ketone; aliphatic carboxylic esters such as ethyl acetate and butyl acetate; aromatic hydrocarbons such as toluene and xylene; aliphatic hydrocarbons such as hexane, heptane and cyclohexane; chlorinated hydrocarbons such as dichlormethane and dichloroethane; aliphatic nitriles such as acetonitrile; aliphatic sulphoxides and sulphones such as dimethyl sulphoxide and sulpholane; aliphatic carboxamides such as methyl acetamide and dimethylformamide; aliphatic and araliphatic ethers such as diethyl ether and anisole. In addition, water or mixtures of water with the abovementioned organic solvents can also be used as solvents.

The oxidants used are the oxidants which are suitable for oxidative polymerization of pyrrole; these are described, for example, in J. Am. Chem. Soc. 85, 484 (1963). For practical reasons, inexpensive oxidants which are easy to handle, such as iron(III) salts such as $FeCl_3$, $Fe(ClO_4)_3$ and the iron(III) salts of organic acids and inorganic acids containing organic radicals, furthermore $H_2O_2$, $K_2Cr_2O_7$, alkali metal persulphates, ammonium persulphates, alkali metal perborates, potassium permanganate and copper salts, such as copper tetrafluoroborate, are preferred.

For the oxidative polymerization of the thiophenes of the formula II, 2,2, 2,5 equivalents of oxidant are theoretically required per mol of thiophene (see e.g. J. Polym. Sc. Part A Polymer Chemistry Vol. 26, S, 1287 (1988). In practice, however, the oxidant is applied in a certain excess, e.g. in an excess of 0.1 to 2 equivalents per mol of thiophene).

The use of persulphates and iron(III) salts of organic acids and of inorganic acids containing organic radicals has the great application advantages that they do not have a corrosive action and, in particular, that the oxidation of the 3,4-disubstituted thiophenes of the formula (II) proceeds so slowly when they are used that thiophenes and oxidants can be applied together onto the metal foil from a solution or from a printing paste. After application of the solution or the paste, the oxidation can be accelerated by warming the coated metal foil.

When the other abovementioned oxidants such as $FeCl_3$, $H_2O_2$ or perborates are used, the oxidative polymerization proceeds so quickly that separate application of oxidants and thiophene onto the substrate to be coated is necessary, but, in contrast, warming is no longer necessary.

Examples which may be mentioned of iron(III) salts of inorganic acids containing organic radicals are the iron(III) salts of the monoesters of sulphuric acid with $C_1$-$C_{20}$-alkanols, for example the Fe(III) salt of lauryl sulphate.

Examples which may be mentioned of iron(III) salts of organic acids are: the Fe(III) salts of $C_1$-$C_{20}$-alkylsulphonic acids, such as of methane- and dodecane-sulphonic acid; of aliphatic $C_1$-$C_{20}$-carboxylic acids, such as of 2-ethylhexylcarboxylic acid; of aliphatic perfluorocarboxylic acids, such as of trifluoroacetic acid and of perfluorooctanoic acid; of aliphatic dicarboxylic acids, such as of oxalic acid and, in particular, of aromatic sulphonic acids which are optionally substituted by $C_1$-$C_{20}$-alkyl groups, such as benzenesulphonic acid, p-toluenesulphonic acid and of dodecylbenzenesulphonic acid.

It is also possible to employ mixtures of these abovementioned Fe(III) salts of organic acids.

When the 3,4-dialkoxy-thiophenes of the formula (II) and the oxidants are applied separately, the metal foils are preferably initially coated with the solution of the oxidant and subsequently with the solution of the 3,4-dialkoxy-thiophene. When, as preferred, the thiophene and oxidant are applied together, the metal foils are only coated with one solution, namely a solution containing a thiophene and an oxidant. Since a portion of the thiophene evaporates during this joint application the oxidant is added to the solution in this method of procedure in an amount which is reduced in accordance with the anticipated loss of thiophene.

In addition, the solutions may contain organic binders which are soluble in organic solvents, such as poly(vinyl acetate), polycarbonate, poly(vinyl butyrate), polyacrylates, polymethacrylates, polystyrene, polyacrylonitrile, poly(vinyl chloride), polybutadiene, polyisoprene, polyethers, polyesters, silicones, and pyrrole/acrylate, vinyl acetate/acrylate and ethylene/vinyl acetate copolymers each of which are soluble in organic solvents. It is also possible to use water-soluble binders such as polyvinyl alcohols as thickeners.

The solutions to be applied to the metal foil preferably contain 1 to 30% by weight of the thiophene derivative of the formula (II) and 0 to 30% by weight of binder, both percentages by weight being based on the total weight of the solution.

The solutions are applied to the substrates by known processes, for example by spraying, knife coating, spreading or printing.

The thickness of the applied coating after drying is generally 1.0 to 500 $\mu$m, preferably 10 to 200 $\mu$m, depending on the desired conductivity of the coating.

After application of the solutions, the solvents can be removed by simple evaporation at room temperature. In order to achieve higher processing rates, it is, however, more advantageous to remove the solvents at elevated temperatures, for example at temperatures of from 20° to 300° C., preferably 40° to 250° C. The removal of the solvents at elevated temperature is also more advantageous since it has been found that the electrical conductivity of the coating can be increased substantially, namely by up to a power of ten, by thermal aftertreatment of the coatings at temperatures of from 50° to 250° C., preferably 100° to 200° C. The thermal aftertreatment can be combined directly with the removal of the solvent or alternatively carried out at an interval in time from finishing the coating.

Depending on the type of polymer used for the coating, the thermal treatment lasts 5 seconds to 5 minutes.

The thermal treatment can be carried out, for example, by moving the coated metal foils through a heating chamber at the desired temperature at a rate such that the residence time desired at the selected temperature is achieved, or bringing the coated metal foils into contact with a hotplate at the desired temperature for the desired residence time.

After removal of the solvents (drying) and before thermal aftertreatment, it may be advantageous to wash the excess oxidant out of the coating using water.

The invention furthermore relates to electrolyte capacitors which contain, as solid electrolytes, the polythiophenes built up from the structural units of the formula (I). Solid electrolyte capacitors of this type have the following structure:

1st layer:
Foil of an oxidizable metal, for example aluminium, niobium or tantalum;

2nd layer:
Oxide layer of the metal;

3rd layer:
Polythiophene built up from structural units of the formula (I); and, if appropriate 4th layer:
Contact, for example a thin layer of substances which are good conductors of the electrical current, such as conductive silver, copper or paint filled with carbon black.

EXAMPLE 1

About 30 mg (corresponding to a dry coating thickness of about 60 $\mu$m) of a solution of 2.0 g of iron(III) p-toluenesulphonate, 0.5 g of 3,4-ethylenedioxy-thiophene in 5 g of a 1:2 mixture of acetone and isopropanol were applied to an aluminium electrode which has been subjected to forming (=oxidized on one side) (surface area about 1.3 × 1.3 $cm^2$), and the solvent was removed quantitatively at room temperature. The polythiophene coating was subsequently provided with a contact made of conductive silver.

The electrical values of the capacitor thus obtained (capacities at high and low frequencies, tan $\delta$ values (dielectric displacement) and leakage current) were determined using a "Digitalbrücke GR 1688" measuring instrument supplied by Messrs. GenRad. The values are given in Table 1 following the examples.

EXAMPLE 2

The procedure employed was as in Example 1, with the difference that the polythiophene coating was not dried at room temperature, but instead at 60° to 70° C.

The electrical values of the capacitor thus obtained are given in Table 1.

EXAMPLE 3

The solution of 1.0 g of iron(III) p-toluene-sulphonate, and 0.5 g of 3,4-ethylenedioxy-thiophene in 5 g of a 1:2 mixture of acetone and isopropanol was applied as described in Example 1 to an aluminium electrode which has been subjected to forming, and dried at room temperature.

The electrical values of the capacitor thus obtained are shown in Table 1.

EXAMPLE 4

The procedure followed was as in Example 3, with the difference that the coating was dried at 60° C.

The electrical values of the capacitor thus obtained are given in Table 1.

EXAMPLE 5

The solution of 1.5 g of iron(III) p-toluene-sulphonate and 0.5 g of 3,4-ethylenedioxy-thiophene in 4 g of isopropanol was applied as described in Example 1 to an aluminium electrode which has been subjected to forming, and dried at room temperature.

The electrical values of the capacitor thus obtained are given in Table 1.

EXAMPLE 6

The procedure followed was as described in Example 5, but with the difference that the residues of the solvent initially removed at room temperature were removed by warming the coated foil at 120° C. for 5 minutes.

The electrical values of the capacitor thus obtained are given in Table 1.

EXAMPLE 7

The solution of 1.0 g iron(III) methane-sulphonate and 0.5 g of 3,4-ethylenedioxy-thiophene in 5 g of a 1:2 mixture of acetone and isopropanol is applied as described in Example 1 to an aluminium electrode which has been subjected to forming, and the solvent is removed by warming the coated metal foil at 60° C.

The electrical values of the capacitor obtained are given in Table 1.

EXAMPLE 8

The procedure followed was as described in Example 7, with the difference that the solvent was removed at room temperature.

The electrical values of the capacitor thus obtained are given in Table 1.

EXAMPLE 9

A solution of 2.5 g of iron(III) p-toluene-sulphonate, 0.5 g of 3,4-ethylenedioxy-thiophene and 1.25 g of poly(vinyl acetate) in 25 g of a 1:1 mixture of acetone and isopropanol is applied as described in Example 1 to an aluminium electrode which has been subjected to forming. The solvent is removed at room temperature.

The electrical values of the capacitor thus obtained are shown in Table 1.

EXAMPLE 10

The solution of 0.5 g of 3,4-propylene-1,2-dioxythiophene and 1.0 g of iron(III) toluenesulphonate in 5 g of a 1:2 mixture of acetone and isopropanol was applied as described in Example 1 to an aluminium electrode which has been subjected to forming, and dried for 1 hour at room temperature and for 1 hour at 60° C.

The electrical values of the capacitor thus obtained are given in Table 1.

TABLE 1

| Example | Capacity C [nF] at 240 Hz | Capacity C [nF] at 20 KHz | tan δ (at 240 Hz) | $C_{20\,KHz}/C_{240\,Hz}$ [%] | Leakage current at 5 V after 30 sec. [μA] |
| --- | --- | --- | --- | --- | --- |
| 1 | 421 | 401 | 0.01 | 95 | 0.2 |
| 2 | 559 | 503 | 0.02 | 90 | <0.1 |
| 3 | 502 | 465 | 0.018 | 93 | <0.1 |
| 4 | 625 | 574 | 0.018 | 92 | <0.1 |
| 5 | 436 | 404 | 0.01 | 93 | 0.1 |
| 6 | 470 | 438 | 0.017 | 93 | <0.1 |
| 7 | 502 | 478 | 0.01 | 95 | <0.1 |
| 8 | 475 | 462 | 0.009 | 97 | 0.1 |
| 9 | 442 | 306 | 0.1 | 69 | 0.7 |
| 10 | 528 | 503 | 0.013 | 95 | <0.1 |

What is claimed is:

1. In a solid electrolyte capacitor with a solid electrolyte the improvement which comprises using as the solid electrolyte a polythiophene which is built up from structural units of the formula

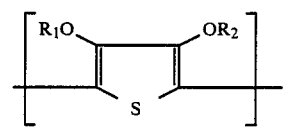 (I)

in which

R$_1$ and R$_2$, independently of one another, stand for hydrogen or a C$_1$-C$_4$-alkyl group or, together, form a C$_1$-C$_4$-alkylene radical or a substituted C$_1$-C$_4$-alkylene radical or a 1,2-cyclohexylene radical.

2. The solid electrolyte capacitor of claim 1 wherein R$_1$ and R$_2$, independently of one another, stand for a C$_1$-C$_4$-alkyl group or, together, form a methylene radical, a methylene radical which is substituted by alkyl, a 1,2-ethylene radical, a 1,2-ethylene radical which is substituted by C$_1$-C$_{12}$-alkyl or phenyl, or a 1,2-cyclohexylene radical.

3. The solid electrolyte capacitor of claim 1, wherein $R_1$ and $R_2$, independently of one another, stand for a methyl or ethyl group or, together, form a methylene, 1,2-ethylene or 1,2-propylene radical.

4. In a method for forming a solid electrolyte capacitor the improvement which comprises producing the polythiophene directly on the metal foil which is used as the anode and is coated on one side with an oxide coating, by oxidative polymerization of 3,4-dialkoxythiophenes of the formula

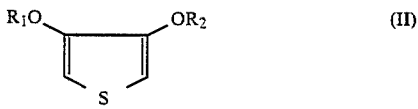

in which $R_1$ and $R_2$, independently of one another, stand for hydrogen or a $C_1$–$C_4$-alkyl group or, together, form a $C_1$–$C_4$-alkylene radical, a substituted $C_1$–$C_4$-alkylene radical or a 1,2-cyclohexylene radical.

5. The method of claim 4, wherein $R_1$ and $R_2$, independently of one another, stand for a $C_1$–$C_4$-alkyl group or, together, form a methylene radical, a methylene radical which is substituted by alkyl, a 1,2-ethylene radical, a 1,2-ethylene radical which is substituted by a $C_1$–$C_{12}$-alkyl or phenyl, or a 1,2-cyclohexylene 6. The method of claim 4, wherein $R_1$ and $R_2$, independently of one another, stand for a methyl or ethyl group or together, for a methylene, 1,2-ethylene or 1,2-propylene radical.

7. The method of claim 4, wherein the polythiophene is produced directly on the metal foil by oxidative polymerization of the 3,4-dialkoxythiophene, by applying a dialkoxythiophene of the formula (II) and an oxidant, to the side of the metal foil which is coated with the oxide coating, and by completing the oxidative polymerization.

8. The method of claim 7, wherein the dialkoxythiophene and the oxidant are applied in the form of a solution.

9. The method of claim 8, wherein the 3,4-dialkoxythiophene of the formula (II) and the oxidant are jointly applied in one solution.

10. The method of claim 7, wherein the oxidant used is an alkali metal persulphate, an ammonium persulphate or an iron(III) salt of an organic acid or an inorganic acid containing an organic radical.

11. A method according to claim 7, wherein the oxidative polymerization is completed by warming the coating.

* * * * *

UNITED STATES PATENT AND TRADEMARK OFFICE
CERTIFICATE OF CORRECTION

PATENT NO. : 4,910,645

DATED : March 20, 1990

INVENTOR(S) : Jonas et al.

It is certified that error appears in the above-identified patent and that said Letters Patent is hereby corrected as shown below:

Col. 8, claim 5  After " cyclohexylene " insert -- radical. --

Signed and Sealed this

Thirty-first Day of March, 1992

*Attest:*

*Attesting Officer*

HARRY F. MANBECK, JR.

*Commissioner of Patents and Trademarks*